US009185100B1

(12) United States Patent
Juels

(10) Patent No.: US 9,185,100 B1
(45) Date of Patent: Nov. 10, 2015

(54) DEVICE PAIRING USING A CRYPTOGRAPHIC COMMITMENT PROCESS INVOLVING MEASURED MOTION VALUES

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 89 days.

(21) Appl. No.: 14/136,871

(22) Filed: Dec. 20, 2013

(51) Int. Cl.
*H04L 29/06* (2006.01)

(52) U.S. Cl.
CPC ............... *H04L 63/08* (2013.01); *H04L 63/06* (2013.01); *H04L 63/166* (2013.01)

(58) Field of Classification Search
CPC ........ H04L 63/08; H04L 63/166; H04L 63/06
USPC ....................................................... 713/151
See application file for complete search history.

(56) References Cited

U.S. PATENT DOCUMENTS

| 7,907,901 B1 * | 3/2011 | Kahn et al. .................... 455/41.2 |
| 2013/0065517 A1 * | 3/2013 | Svensson et al. ............... 455/39 |
| 2013/0157562 A1 * | 6/2013 | Urard et al. ..................... 455/39 |
| 2014/0206288 A1 * | 7/2014 | Liu et al. ...................... 455/41.2 |

OTHER PUBLICATIONS

D. Bichler et al., "Key Generation Based on Acceleration Data of Shaking Processes," Proceedings of the 9th International Conference on Ubiquitous Computing (UbiComp), Lecture Notes in Computer Science, Sep. 2007, pp. 304-317, vol. 4717, Innsbruck, Austria.

C. Castelluccia et al., "Shake Them Up! A Movement-Based Pairing Protocol for CPU-Constrained Devices," Proceedings of the 3rd International Conference on Mobile Systems, Applications, and Services (MobiSys), Jun. 2005, pp. 51-64.

C. Cornelius et al., "Recognizing Whether Sensors are on the Same Body," Proceedings of the 9th International Conference on Pervasive Computing, Jun. 2011, pp. 332-349.

Y, Dodis et al., "Fuzzy Extractors: How to Generate Strong Keys from Biometrics and Other Noisy Data," Advances in Cryptology—Eurocrypt, Lecture Notes in Computer Science, May 2004, pp. 523-540, vol. 3027.

B. Groza et al., "SAPHE—Simple Accelerometer Based Wireless Pairing with HEuristic Trees," Proceedings of the 10th International Conference on Advances in Mobile Computing & Multimedia (MoMM), Dec. 2012, pp. 161-168, Bali, Indonesia.

(Continued)

*Primary Examiner* — Mohammad W Reza
(74) *Attorney, Agent, or Firm* — Ryan, Mason & Lewis, LLP

(57) ABSTRACT

A method includes receiving, in a first device, an access request. The method further includes measuring a motion of the first device to determine a first motion value, performing a pairing protocol with a second device, and granting the access request responsive to a successful pairing in accordance with the pairing protocol. The pairing protocol comprises a cryptographic commitment process. The successful pairing is based at least in part on a determination that a second motion value supplied by the second device substantially matches the first motion value. The cryptographic commitment process comprises sending a committed first motion value to the second device prior to receiving the second motion value from the second device.

20 Claims, 4 Drawing Sheets

(56) References Cited

OTHER PUBLICATIONS

A. Juels et al., "A Fuzzy Vault Scheme," ACM Journal on Designs, Codes and Cryptography, Feb. 2006, pp. 237-257, vol. 38, No. 2.

J. Lester et al., "'Are You with Me?'—Using Accelerometers to Determine if Two Devices are Carried by the Same Person," Proceedings of the Second International Conference on Pervasive Computing, Lecture Notes in Computer Science, Apr. 2004, pp. 33-50, vol. 3001, Vienna, Austria.

R. Mayrhofer et al., "Shake Well Before Use: Intuitive and Secure Pairing of Mobile Devices," IEEE Transactions on Mobile Computing, Jun. 2009, pp. 792-806, vol. 8, No. 6.

R. Mayrhofer et al., "Spontaneous Mobile Device Authentication Based on Sensor Data," Science Direct, Information Security Technical Report, Aug. 2008, pp. 136-150, vol. 13, No. 3.

M. Rostami et al., "Heart-to-Heart (H2H): Authentication for Implanted Medical Devices," Proceedings of the ACM SIGSAC Conference on Computer and Communications Security (CCS), Nov. 2013, pp. 1099-1112, Berlin, Germany.

N. Saxena et al., "Vibrate-to-Unlock: Mobile Phone Assisted User Authentication to Multiple Personal RFID Tags," Proceedings of the 9th Annual IEEE International Conference on Pervasive Computing and Communications (PerCom), Mar. 2011, pp. 181-188.

A. Studer et al., "Don't Bump, Shake on It: The Exploitation of a Popular Accelerometer-Based Smart Phone Exchange and Its Secure Replacement," Twenty-Seventh Annual Computer Security Applications Conference (ACSAC), Dec. 2011, pp. 333-342.

J. Suomalainen et al., "Security Associations in Personal Networks: A Comparative Analysis," Proceedings of the 4th European Conference on Security and Privacy in Ad-Hoc and Sensor Networks (ESAS), Lecture Notes in Computer Science, Jul. 2007, pp. 43-57, vol. 4572, Cambridge, United Kingdom.

U.S. Appl. No. 13/718,171, filed in the name of Ari Juels on Dec. 18, 2012 and entitled "Authentication of External Devices to Implantable Medical Devices Using Biometric Measurements."

\* cited by examiner

DEVICE PAIRING USING A CRYPTOGRAPHIC COMMITMENT PROCESS INVOLVING MEASURED MOTION VALUES

FIELD

The present invention relates generally to device authentication, and more particularly to motion-based authentication of devices.

BACKGROUND

Users are increasingly likely to carry multiple devices on or near their persons on a regular basis. For example, as wearable computing devices such as fitness monitors, augmented-reality headsets and smartwatches grow in popularity, many users will have continuous access to two or more devices. Each of the devices can act as a "something-you-have" authentication factor and thus multiple devices may be used for multi-factor authentication processes.

SUMMARY

Illustrative embodiments of the present invention provide techniques for motion-based authentication of devices.

In one embodiment, a method comprises receiving, in a first device, an access request, measuring a motion of the first device to determine a first motion value, performing a pairing protocol with a second device, and granting the access request responsive to a successful pairing in accordance with the pairing protocol. The pairing protocol comprises a cryptographic commitment process. The successful pairing is based at least in part on a determination that a second motion value supplied by the second device substantially matches the first motion value. The cryptographic commitment process comprises sending a committed first motion value to the second device prior to receiving the second motion value from the second device.

In another embodiment, an apparatus comprises one or more motion sensors, a memory, and a processor coupled to the memory and configured to implement a motion-based pairing module for a first device. The motion-based pairing module is configured to receive an access request, initiate a motion measurement using the one or more motion sensors, determine a first motion value based on the motion measurement, perform a pairing protocol with a second device, and grant the access request responsive to a successful pairing in accordance with the pairing protocol. The pairing protocol comprises a cryptographic commitment process. The successful pairing is based at least in part on a determination that a second motion value supplied by the second device substantially matches the first motion value. The motion-based pairing module is configured to perform the cryptographic commitment process by sending a committed first motion value to the second device prior to receiving the second motion value from the second device.

In another embodiment, a method comprises sending, to a first device from a second device, an access request, measuring a motion of the second device to determine a second motion value, performing a pairing protocol with the first device, and receiving, from the first device, an indication that the access request is granted responsive to a successful pairing in accordance with the pairing protocol. The pairing protocol comprises a cryptographic commitment process. The successful pairing is based at least in part on a determination that a first motion value supplied by the first device substantially matches the second motion value. The cryptographic commitment process comprises sending a committed second motion value to the first device prior to receiving the first motion value from the first device.

In another embodiment, an apparatus comprises one or more motion sensors, a memory, and a processor coupled to the memory and configured to implement a motion-based pairing module for a second device. The motion-based pairing module is configured to send, to a first device, an access request, initiate a motion measurement using the one or more sensors, determine a second motion value based on the motion measurement, perform a pairing protocol with the first device, and receive, from the first device, an indication that the access request is granted responsive to a successful pairing in accordance with the pairing protocol. The pairing protocol comprises a cryptographic commitment process. The successful pairing is based at least in part on a determination that a first motion value supplied by the first device substantially matches the second motion value. The motion-based pairing module is configured to perform the cryptographic commitment process by sending a committed second motion value to the first device prior to receiving the first motion value from the first device.

These and other features and advantages of embodiments of the present invention will become more readily apparent from the accompanying drawings and the following detailed description.

DETAILED DESCRIPTION

Illustrative embodiments of the present invention will be described herein with reference to exemplary communication systems and associated processing devices, networks, servers, etc. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another over a network.

Figure 1:
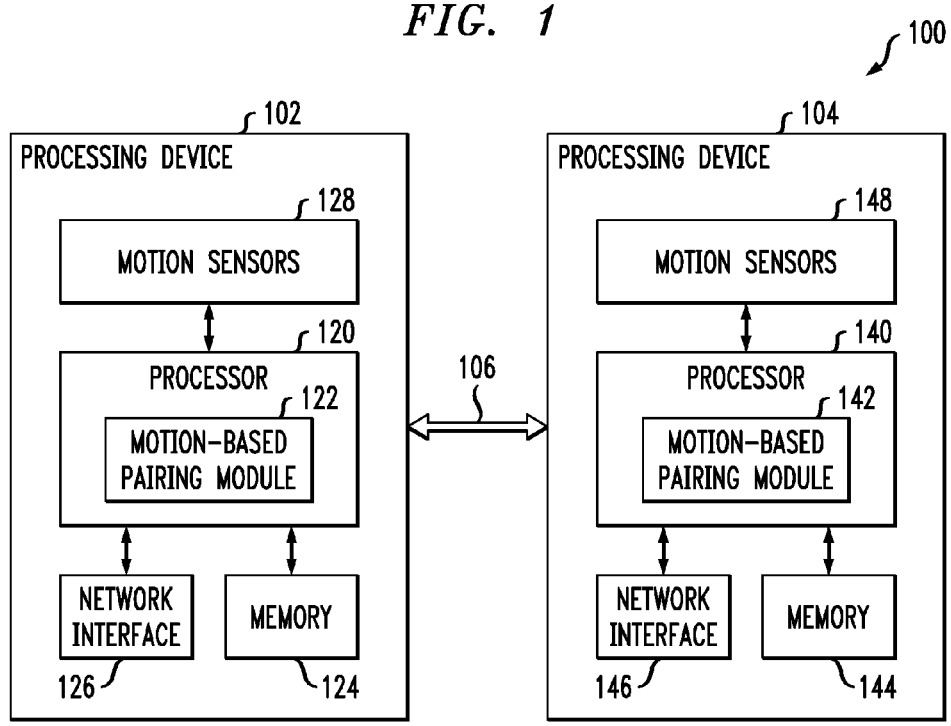
FIG. 1 is a simplified block diagram of an exemplary communication system, according to an embodiment of the invention.

FIG. 1 shows a communication system 100 comprising processing devices 102 and 104 connected via connection 106. The processing devices 102 and 104 are also referred to herein as first and second devices. Processing devices 102 and 104 may be mobile devices such as cell phones, tablets, laptops, personal digital assistants (PDAs), wearable computing devices such as smartwatches, Google Glass®, etc., as well as other computing and communication devices.

Processing devices 102 and 104 comprise respective processors 120 and 140, memories 124 and 144, network interfaces 126 and 146 and motion sensors 128 and 148. Processing devices 102 and 104 further comprise respective motion-based pairing modules 122 and 142.

The processors 120 and 140 may comprise microprocessors, microcontrollers, application-specific integrated circuits (ASICs), field-programmable gate arrays (FPGAs) or other types of processing circuitry, as well as portions or combinations of such circuitry elements.

Each of the memories 124 and 144 may comprise random access memory (RAM), read-only memory (ROM), a hard disk drive (HDD), flash memory or other types of memory, in any combination. The memories 124 and 144 may be viewed as examples of what are more generally referred to herein as "computer program products" storing executable program code.

The network interfaces 126 and 146 allow the processing devices 102 and 104 to establish connection 106 and communicate with one another. The network interfaces 126 and 146 further permit processing device 102 and 104 to communicate over networks with other devices, servers, etc. not shown in FIG. 1.

For security reasons, the connection 106 may be a short range or private connection. For example, many processing devices including cellular phones come equipped with Bluetooth network interface circuitry. As another example, near field communication (NFC) network interface circuitry is equipped in many newer processing devices such as cellular phones. The connection 106, however, may be another network type such as a WiFi or WiMAX network, a cellular network, a telephone or cable network, a local area network (LAN), a wide area network (WAN) a global computer network such as the Internet, or various portions or combinations of these and other types of networks.

Motion sensors 128 and 148 comprise one or more sensors which allow the processing devices 102 and 104 to measure motion. In some embodiments, motion sensors 128 and 148 comprise one or more accelerometers, one or more cameras, or combinations of accelerometers and cameras. Embodiments, however, are not limited solely to devices that include accelerometers and cameras for motion sensors. Instead, a wide range of other types of motion sensors may be utilized, including by way of example gyroscopes.

Processing devices 102 and 104 implement respective motion-based pairing modules 122 and 142. Motion-based pairing modules 122 and 142 may comprise hardware, software, or combinations of hardware and software which permit the processing devices 102 and 104 to perform various pairing protocols described below.

The processing devices 102 and 104 may include additional components not specifically illustrated in FIG. 1 which are of a type commonly used in processing devices, as will be appreciated by those skilled in the art.

It is to be appreciated that the particular set of elements shown in FIG. 1 in system 100 is presented by way of example, and in other embodiments additional or alternative elements may be used. Thus, other embodiments may include additional networks and additional devices or servers.

As mentioned previously, various elements of system 100, including portions of the processing devices 102 and 104 such as functional modules 122 and 142, and other elements may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere® which may have an associated virtual infrastructure management system such as the VMware® vCenter™. The underlying physical machines may comprise one or more distributed processing platforms that include storage products, such as VNX® and Symmetrix® VMAX®, both commercially available from EMC Corporation of Hopkinton, Mass. A variety of other storage products may be utilized to implement at least a portion of the system 100.

Figure 2:
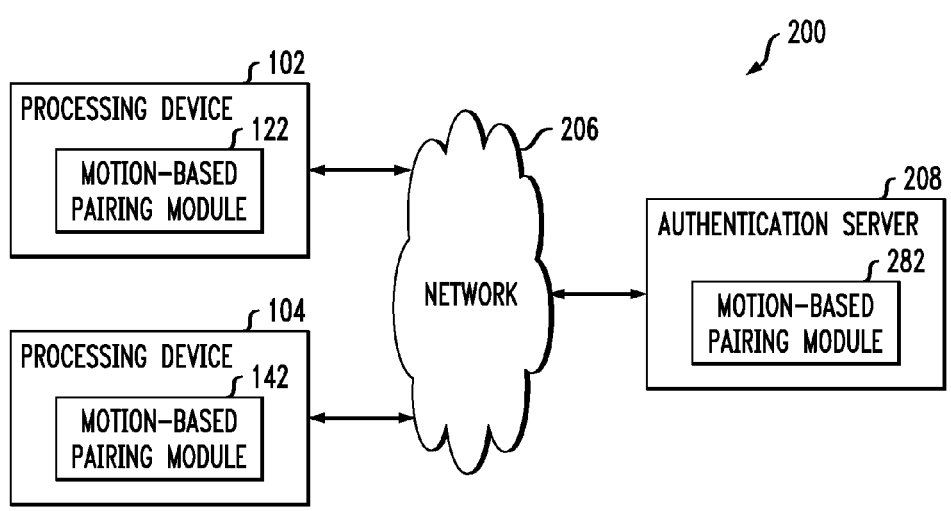
FIG. 2 illustrates one possible implementation of the exemplary communication system, according to an embodiment of the invention.

FIG. 2 illustrates a possible implementation 200 of the communication system shown in FIG. 1 wherein the processing devices 102 and 104 authenticate to a remote authentication server 208 over a network 206. The network 206 may be a variety of network types similar to the connection 106 described above. The authentication server 208 includes a motion-based pairing module 282 so to participate in a pairing protocol with at least one of the processing devices 102 and 104. Although not explicitly shown in FIG. 2, the authentication server 208 may comprise a processor, memory, network interface, etc. similar to the processors 120 and 140, the memories 124 and 144, and network interfaces 126 and 146 of the processing devices 102 and 104.

Figure 3:
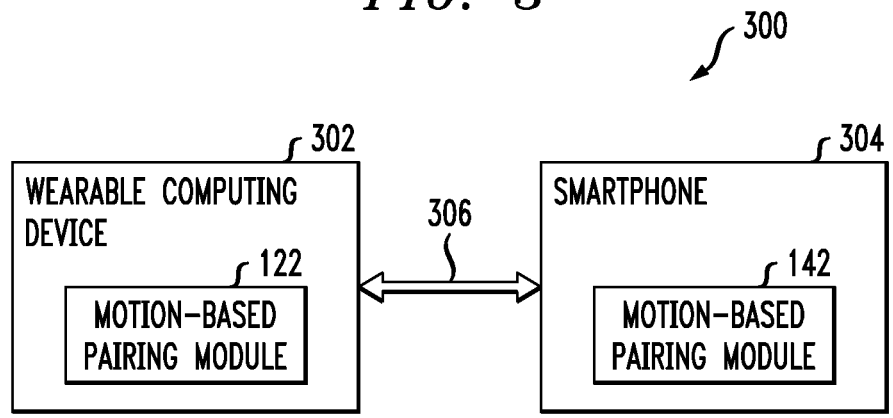
FIG. 3 illustrates one possible implementation of the exemplary communication system, according to an embodiment of the invention.

FIG. 3 illustrates another possible implementation 300 of the communication system shown in FIG. 1. In the implementation 300, the processing device 102 is represented as a wearable computing device 302 while the processing device 104 is represented as a smartphone 304. The wearable computing device 302 and smartphone 304 establish a connection 306 with one another, in a manner similar to that described above with respect to FIG. 1. As will be detailed below, embodiments allow a user to combine two "something-you-have" factors in the form of the wearable computing device 302 and smartphone 304 to facilitate user authentication. It is important to note, however, that the implementation 300 is merely one example. Processing devices 102 and 104, as described above, may be various other mobile or computing devices. For example, processing device 102 may be a tablet and processing device 104 may be a smartphone. In some embodiments, the processing devices 102 and 104 may be two different wearable computing devices, two different smartphones, etc. In addition, in some instances the processing devices 102 and 104 may be devices associated with two different users.

As discussed above, users are increasingly likely to carry multiple processing devices. In the implementation 300 a user has both a wearable computing device 302 and a smartphone 304. Embodiments of the invention utilize multiple processing devices to facilitate user authentication. Embodiments verify simultaneous user possession of two devices by observing correlated motion in the devices. The motion can be produced intentionally by having the user shake or otherwise move the devices in a correlated manner. Alternatively, motion may be observed and/or produced implicitly by a user that merely holds the devices at the same time or over some duration of time.

The presence of multiple, user-controlled devices with various sensors allows for several options for authentication and pairing protocols based on simultaneous motion. Embodiments will be described below primarily in the context of implementation 300, where a user has two wireless devices—the wearable computing device 302 and smartphone 304. For simplicity, the smartphone 304 will be denoted S below and the wearable computing device 302 will be denoted W below. It is to be noted, however, that embodiments are not limited solely to implementations in which the processing devices comprise smartphones and wearable computing devices. Instead, various other processing devices may be utilized. In addition, unless otherwise noted herein the functionality performed by S and W may be reversed.

In embodiments, a user can shake or otherwise move devices S and W simultaneously, or hold the devices S and W at the same time, to achieve any one of or combination of tasks. Examples of such tasks include, by way of example, establishing a shared key, authenticating access to a cryptographic key or key share on S and/or W, unlocking S or W, remote authentication to an authentication server using S and W, etc. FIG. 2 shows an implementation 200 in which two processing devices 102 and 104 remotely authenticate to authentication server 208.

Simultaneous motion may be used for device pairing. For example, to establish an authenticated channel between devices without a pre-existing relationship, techniques can take the approach of deriving a shared cryptographic key between devices to pair them. As an example, given strings $m_S$ and $m_W$ representing motion readings by S and W, respectively, one approach is to apply a feature-derivation function $f$ to derive a common key $\kappa = f(m_S) = f(m_W)$. Success is achieved if $dist(m_S, m_W) \leq d$ for some distance metric d and a predetermined threshold $\delta$ determined by $f$. The requirement that $f$ be computed locally on each device, however, severely restricts the set of achievable distance metrics and also results in a high degree of entropy loss in $\kappa$.

Embodiments of the invention use lightweight approaches to device pairing based on shared motion such as correlated motions in one or more devices or simultaneous motion in one or more devices. Embodiments use cryptographic commitments, which permit comparison of $m_S$ and $m_W$ directly on S and W. As a result, a pairing device can enforce any desired distance metric between $m_S$ and $m_W$.

In some embodiments, different devices enforce different distance metrics. In some instances a device may desire a higher degree of accuracy in the shared motion and thus selects and uses a less tolerant distance metric. As an example, a user may desire a higher degree of security for a smartphone relative to a wearable computing device. A smartphone may contain more sensitive private information and thus S may select a smaller distance metric relative to the distance metric selected by W. In other embodiments, W may select a smaller distance metric than S, or devices S and W may use the same distance metric.

Flexibility in distance metric selection permits the design of pairing protocols which are simpler and more computationally efficient while also better conserving entropy relative to techniques which use a feature-derivation function $f$ as described above.

Simultaneous movement of two or more devices may be utilized in a variety of contexts. For example, simultaneous shaking of two devices for secure pairing may be used to perturb radio emissions used to create shared keys so as to render an attacker unable to distinguish between emissions of the two devices. Shaking devices may also create a shared source of randomness from which cryptographic keys are derived.

Measurements from motion sensors such as accelerometers, however, are likely to differ somewhat even between devices experiencing similar movement. To counteract this, error tolerance is needed. As one example, derivation of short keys may be used. Short keys, however, lead to lower entropy and less security. Tree-based hashing approaches or fuzzy cryptography may also be used. Fuzzy cryptography is designed to derive a key from noisy measurement of a static value, such as a fingerprint. Accelerometer readings of shaken devices, in contrast, contain a high degree of one-time or transient randomness. Every shake is slightly different and unpredictable. Pairing protocols used in embodiments of the invention rely on the transient nature of the shared randomness associated with shared or correlated motion to two or more devices.

Figure 4:
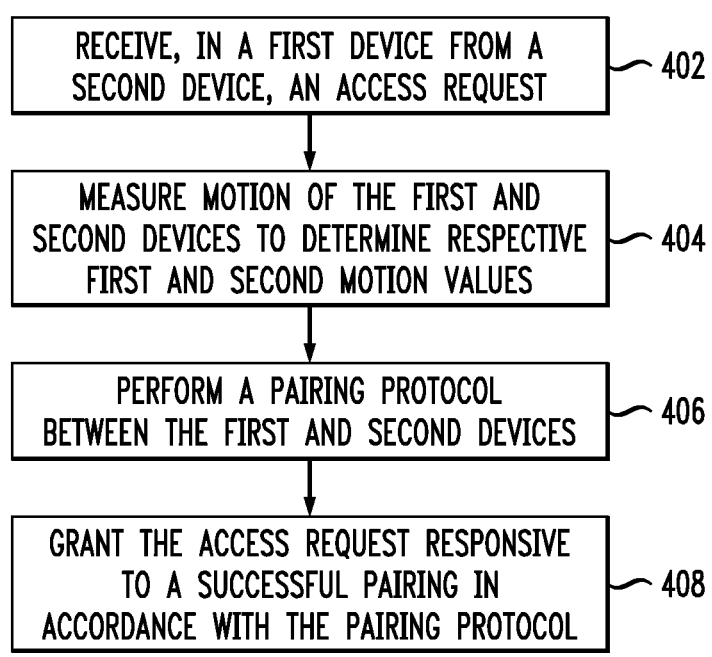
FIG. 4 is a flow diagram showing a process for device authentication, according to an embodiment of the invention.

FIG. 4 illustrates a process 400 for device pairing. The process 400 starts with step 402, receiving, in a first device from a second device, an access request. Processing devices 102 and 104 are examples of the first and second devices, respectively. Next, in step 404, the first and second devices measure motion of the first and second devices to determine respective first and second motion values. This involves initiating a reading or measurement using one or more motion sensors and determining a motion value from the measured motion. In step 406, the first and second devices perform a pairing protocol. The pairing protocol utilizes the first and second motion values, or information derived therefrom. The access request is granted in step 408 responsive to a successful pairing in accordance with the pairing protocol.

Pairing is the process of establishing a secure channel between two devices that lack a previously shared secret. Various techniques may be used to establish a shared secret. For example, a shared secret may be established via visual or auditory confirmation by a user, keying a secret into one or more devices to be paired, using shared environmental information such as radio-frequency signals, etc. Embodiments utilize device motion for pairing. However, as will be detailed below, embodiments are not limited solely to use of device motion. Instead, device motion may be a single factor in a multi-factor authentication process or some motion-based information may be combined with biometric measurements or other information associated with a user or device, etc.

As described above, devices may independently derive a shared key $\kappa$ based on shared motion. This approach, however, results in a high degree of entropy loss, as the devices to be paired must individually attempt to eliminate differences between their respective readings. Thus, keys must generally by quite short to ensure equality. A key advantage of performing independent key derivation is to prevent leakage of key material between devices prior to pairing.

Embodiments pair devices using a one-time source of entropy, illustratively correlated or shared motion. Thus, it is possible for two devices S and W to reveal their respective motion measurements $m_S$ and $m_W$ after they have made cryptographically binding commitments to them. S and W can then independently compare the two measurements $m_S$ and $m_W$.

Figure 5:
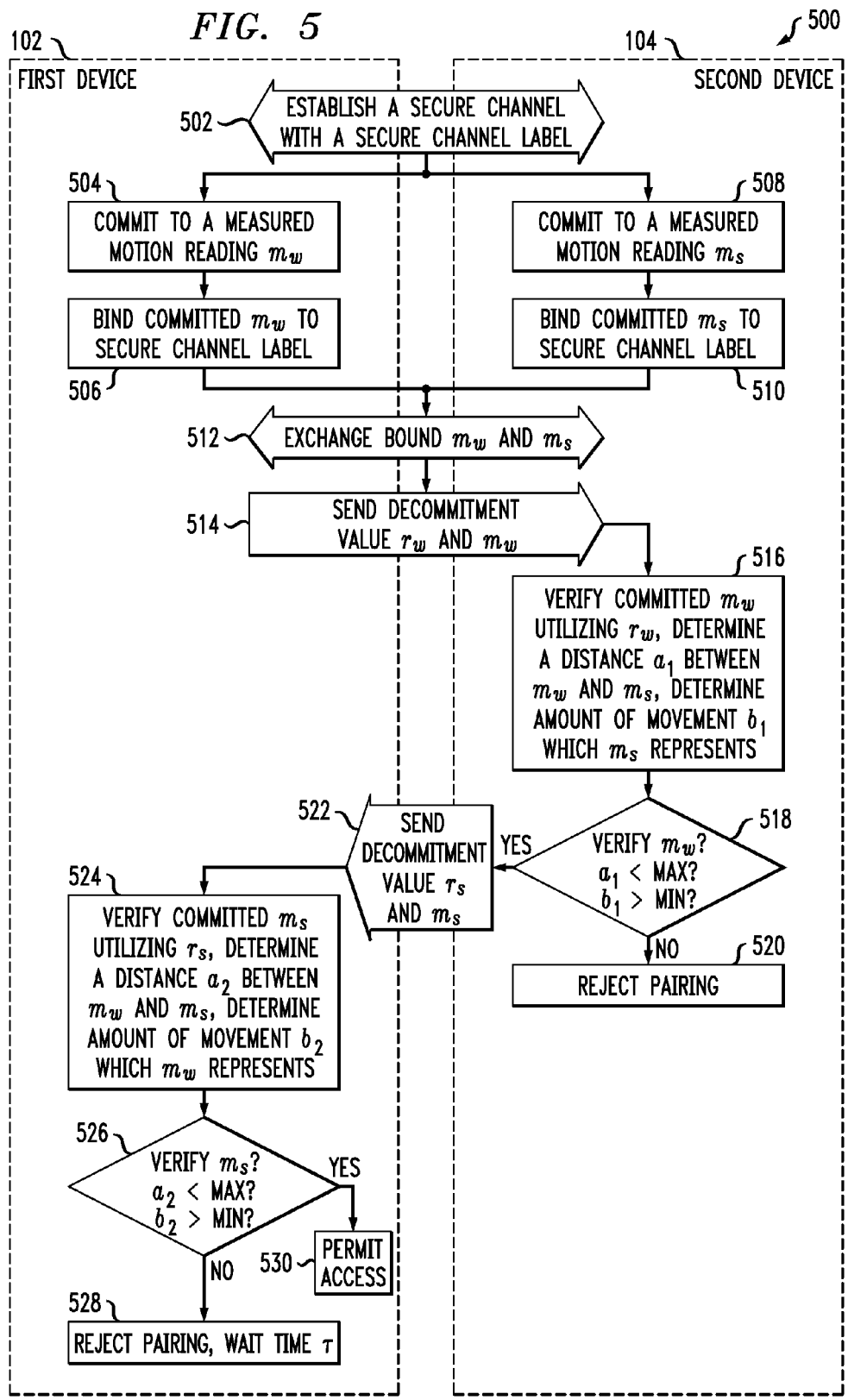
FIG. 5 is a flow diagram showing portions of a pairing protocol, according to an embodiment of the invention.

FIG. 5 illustrates portions of a pairing protocol 500 which is carried out in some embodiments of the invention.

In step 502, the first device 102 and the second device 104 establish a secure channel with a secure channel label. In the pairing protocol 500, W is the first device 102 and S is this second device 104. Next, in steps 504 and 506, the first device 102 commits to a measured motion reading $m_W$ and binds the committed $m_W$ to the secure channel label determined in step 502. In steps 508 and 510, the second device 104 commits to a measured motion reading $m_S$ and binds the committed $m_S$ to the secure channel label determined in step 502.

In step 512, the first device 102 and the second device 104 exchange the bound $m_S$ and $m_W$ values. Responsive to receiving the bound $m_S$, the first device 102 sends in step 514 a decommitment value $r_W$ and $m_W$ to the second device 104. The second device 104 in step 516 verifies the committed $m_W$ utilizing $r_W$, determines a distance $a_1$ between $m_S$ and $m_W$, and determines an amount of movement $b_1$ which $m_S$ represents.

Verifying the committed $m_W$ allows the second device 104 to ensure that first device 102 in fact committed to the measurement $m_W$ instead of simply providing a random or unrelated bound committed value.

The second device 104 determines the distance $a_1$ in order to ensure that $m_S$ and $m_W$ substantially match one another. The term substantially is used to indicate that an exact match is not necessarily required. As described above, devices such as the first device 102 and the second device 104 may select and utilize different distance metrics. $m_S$ and $m_W$ substantially match one another when the distance $a_1$ is less than an allowable maximum variation or threshold. Thus, $m_S$ and $m_W$ substantially match one another when the first device 102 and the second device 104 perform correlated or similar motions. The correlated or similar motions may be shaking the devices at a substantially similar rate or in a same direction. Devices S and W may be shaken left to right or up and down, moved in a circle, FIG. 8, or other defined pattern, etc. It is to be appreciated that these are merely example of correlated motion, and that embodiments may utilize a wide variety of other types of shared or correlated motion.

Determining the amount of movement $b_1$ which S represents prevents an attacker that tries to exploit the lack of movement in one device to pair it with another. In requiring a minimum amount of movement, embodiments can prevent this type of attack. In other embodiments, however, it may be desirable to allow pairing through a lack of movement of a device. In such embodiments, the second device 104 need not determine the amount of movement $b_1$ which $m_S$ represents.

The second device 104 in step 518 makes a determination as to whether $m_W$ was successfully verified, whether the distance $a_1$ is less than a maximum allowable distance, and whether $b_1$ represents at least a minimum amount of movement. If $m_W$ is verified, $a_1$ is less than the maximum allowable distance, and $b_1$ represents at least the minimum amount of movement, the second device 104 in step 522 sends a decommitment value $r_S$ and $m_S$ to the first device 102. Otherwise, the pairing is rejected in step 520.

The first device 102 in step 524 performs functionality similar to that described above with respect to 516. In step 524, the first device 102 verifies the committed $m_S$ utilizing $r_S$, determines a distance $a_2$ between $m_S$ and $m_W$, and determines an amount of movement $b_2$ which $m_W$ represents.

In step 526, the first device 102 makes a determination as to whether $m_S$ was successfully verified, whether the distance $a_2$ is less than a maximum allowable distance, and whether $b_2$ represents at least a minimum amount of movement. Responsive to this determination, the first device 102 either rejects the pairing in step 528 or permits access in step 530. In step 528, the first device 102 also waits a time $\tau$ before accepting a new request for access. The time $\tau$ in some embodiments is at least equal to the time required to take a full motion reading. Waiting for a time $\tau$ allows the first device 102 to ensure that the second device 104 cannot use the previously received $m_S$ to authenticate in a new session.

In some embodiments, the minimum amount of movement required by the first and second devices 102 and 104 may differ. In addition, the maximum allowable distance allowed by the first and second device 102 and 104 may differ.

Figure 6:
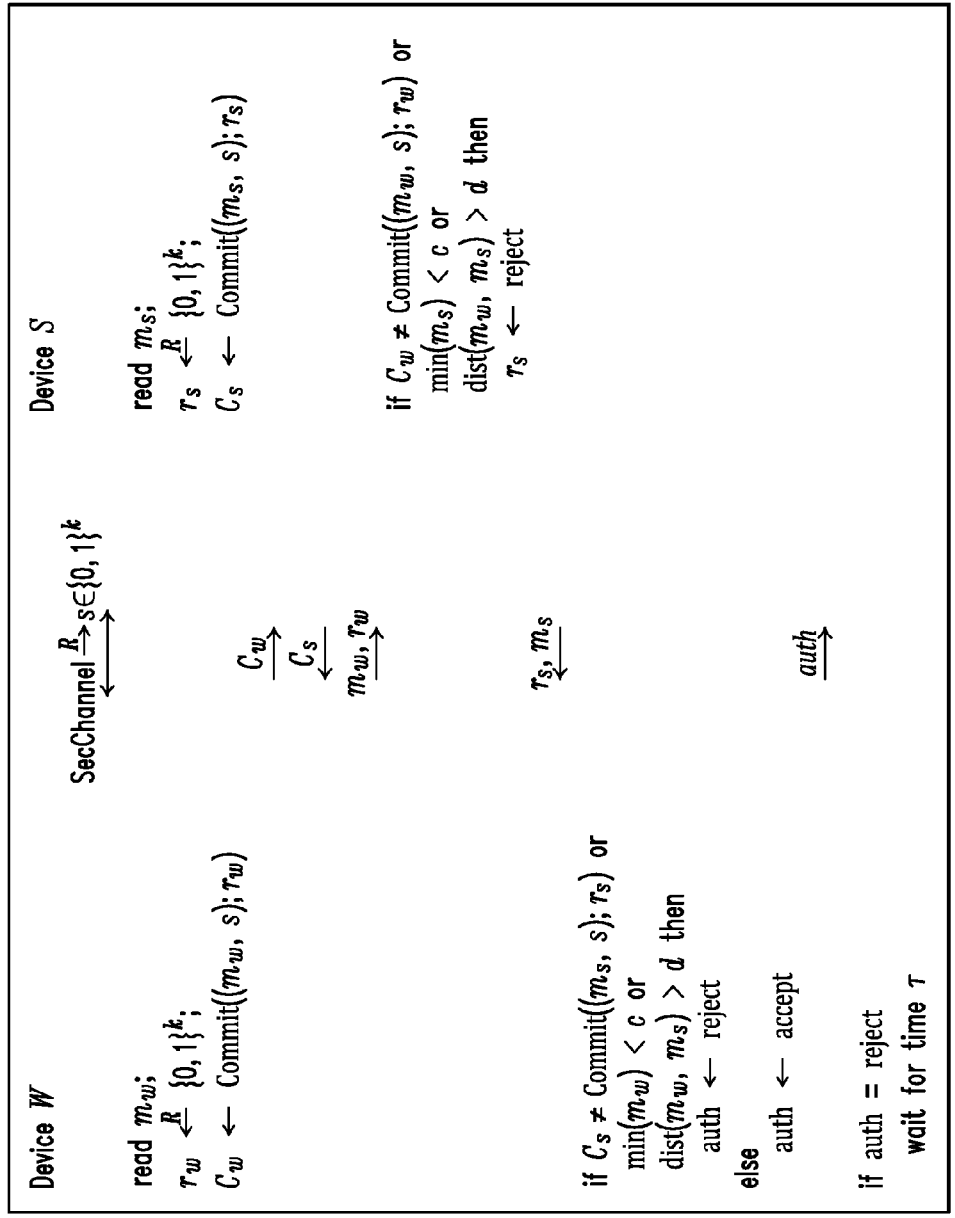
FIG. 6 illustrates an algorithm for performing a pairing protocol, according to an embodiment of the invention.

FIG. 6 illustrates an example of an algorithm for performing a pairing protocol. Since $m_S$ and $m_W$ may be considered one-time values due to their transient randomness, fresh motion readings are used to authenticate each session since the readings are statistically independent across time. As a result, it is possible to safely reveal $m_S$ and $m_W$ at the end of an authentication protocol, which is not possible when using static passwords. The pairing protocol in FIG. 6 thus uses very fast symmetric-key commitment and decommitment rounds and explicit testing of whether $m_S$ and $m_W$ substantially match one another.

The pairing protocol in FIG. 6 starts with establishing a secure, private and authenticated channel between devices S and W. SecChannel denotes an idealized protocol that establishes such a secure channel between devices S and W. In some embodiments, the secure channel is established via transport layer security (TLS). One of the devices S and W assumes the role of a TLS client while the other that of a TLS server.

The pairing protocol in FIG. 6 makes use of an output for the TLS session, or more generally SecChannel, referred to as s. Assuming at least one of S and W is an honest entity, s is with overwhelming probability random and thus unique although it is not secret. In some embodiments, s is a hash of the TLS session key. For convenience, the details of TLS are modeled simply as a protocol SecChannel in FIG. 6 which outputs random label s. In FIG. 6, k is a security parameter, and R represents a random or pseudorandom selection.

Embodiments are not limited solely to use with TLS for secure channel set up. In some instances, S and W may have a preexisting trust relationship, and thus the secure channel may be treated as having been established by some other mechanism. In such instances, a preliminary message requesting session initiation may be used to initiate reading in the two devices. Such a preliminary message may be initiated by either device. A request for access may be considered such a preliminary message. The request for access may also be used to initiate the SecChannel protocol to establish the secure channel.

After setting up the secure channel, the devices S and W read respective motion values $m_S$ and $m_W$. Each of the devices S and W then selects respective decommitment values $r_S$ and $r_W$. In the FIG. 6 protocol, each of $r_S$ and $r_W$ is a random or pseudorandom selection R of binary bits of length k. $r_S$ and $r_W$ are referred to as decommitment values because they allow the devices S and W to recreate the commitment of $m_W$ and $m_S$, respectively.

Next, devices S and W commit their respective readings $m_S$ and $m_W$ to the label s of the secure channel on which it is communicating, preventing its re-use, prior to decommitment, on a different channel. Commit denotes a cryptographic commitment protocol, which takes as input the motion reading, the secure label and the decommitment value. Commit outputs a commitment value, represented in FIG. 6 as $C_S$ and $C_W$ for devices S and W, respectively.

S and TV next exchange their respective committed values $C_S$ and $C_W$. Device W, on receiving $C_S$, sends $m_W$ and $r_W$ to device S. Using $m_W$ and $r_W$, S is able to verify $C_W$. S also checks whether $\min(m_S)<c$ and whether $\text{dist}(m_W, m_S)>d$, where min represents a function used to check that the measurement $m_S$ exceeds a minimum threshold c of movement and dist is a function which checks whether the measurements $m_S$ and $m_W$ differ by more than a distance threshold d. Although FIG. 6 shows a protocol in which S and W use the same thresholds c and d, protocols used in other embodiments are not limited to this arrangement. Instead, as described above, each of S and W may select different thresholds c and/or d.

If $C_W \neq \text{Commit}(m_W, s); r_W)$ or $\min(m_S)<c$ or $\text{dist}(m_W, m_S)>d$, then the protocol rejects the pairing and the decommitment value $r_S$ is set to reject. Otherwise, device S sends $r_S$ and $m_S$ to the device W. Device W then performs a similar check, using $m_S$ and $r_S$ to verify $C_S$, checking whether min $(m_W)<c$ and checking whether $dist(m_W, m_S)>d$. If $C_S \neq Commit(m_S, s)$; $r_S$) or $min(m_W)<c$ or $dist(m_W, m_S)>d$, then W rejects the pairing and sets auth to reject. Otherwise, auth is set to accept. The device W then sends auth to device S. If auth is equal to reject, then the device W waits a time $\tau$ before permitting another access request.

On receiving an auth equal to accept, the device S may perform a number of actions. In some embodiments, the device S unlocks itself on receiving accept. In other embodiments, the device S permits W to access protected information on S on receiving accept. Such protected information may include a cryptographic key or key share.

In some embodiments, single-device decisions may be utilized. For example, an accept or reject decision may be made on a single device. Device S may receive a motion reading $m_W$ from device W and unlock itself on the basis of a local check, or provide access by W to protected information on S on the basis of the local check. A simplified and essentially one-sided variant of the FIG. 6 protocol is appropriate for such arrangements.

As described above with respect to FIG. 2, in some embodiments the processing devices 102 and 104 authenticate to a remote server such as authentication server 208. The processing devices 102 and 104 transmit their respective motion readings to the authentication server 208, which directly compares the motion readings to make an authentication decision. Processing devices 102 and 104 may transmit the respective motion readings, in an appropriately secured manner, to the authentication server 208 after performing the FIG. 6 pairing protocol.

A wide variety of sensors may be used for taking motion readings. Examples of such sensors include accelerometers, cameras, gyroscopes, etc. The first processing device 102 may track the motion of the second processing device 104 using a video camera, in some cases causing the second processing device 104 to display a special symbol such as a Quick Response (QR) code to facilitate the tracking. In some embodiments, the processing devices 102 and 104 use other types of sensors to verify simultaneous possession as a supplement to or as an alternative to the use of motion sensors. For example, simultaneous possession can be detected by means of skin conductance with biometric sensors.

Embodiments may also use the above-described pairing protocols involving cryptographic commitment processes in conjunction with one or more other forms of authentication. In some embodiments, the accept outcome in the FIG. 6 protocol is a single factor in a multi-factor authentication decision. In other embodiments, the accept outcome in the FIG. 6 protocol triggers one or more follow-on authentication protocols. For example, the device S may detect contact with a user's skin, indicating the presence of device S in the user's hand, in addition to detecting correlated motion with device W. The device S may further perform additional biometric authentication such as facial recognition, voice recognition, fingerprint scans, etc.

In some embodiments, successful detection of correlated motion modifies the execution of other authentication protocols or initiates one or more follow-on authentication protocols. For example, a smartphone that confirms correlated motion with a wearable device may prompt a user to enter a three-digit PIN for unlocking the smartphone instead of a four-digit PIN.

A wide variety of authentication protocols using various cryptographic processes may be used in conjunction with the pairing protocols described herein. Examples of such conventional processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The particular processing operations and other system functionality described in conjunction with FIGS. 1-6 are presented by way of illustrative example only, and should not be construed as limiting the scope of the invention in any way. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different techniques, as well as combinations of the above-described techniques. For example, particular features described above with respect to a given embodiment are not restricted solely for use in the given embodiment unless otherwise noted. Instead, embodiments of the invention may combine features described above in conjunction with different embodiments.

It is to be appreciated that the processing functionality such as that described in conjunction with FIGS. 1-6 and the associated examples above can be implemented at least in part in the form of one or more software programs stored in memory and executed by a processor of a processing device such as processing devices 102 and 104. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It is to be appreciated that the particular configuration, elements and operating parameters of the embodiments described above are not requirements of the invention, and should not be construed as limiting the scope of the invention in any way. For example, while described above primarily in the context of a pairing protocol performed between two devices, S and W, embodiments are not so limited. The pairing protocols may be extended for use with the three or more devices. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
  receiving, in a first device, an access request;
  measuring a motion of the first device to determine a first motion value;
  performing a pairing protocol with a second device, the pairing protocol comprising a cryptographic commitment process; and granting the access request responsive to a successful pairing in accordance with the pairing protocol, the successful pairing being based at least in part on a determination that a second motion value supplied by the second device substantially matches the first motion value;

wherein the cryptographic commitment process comprises:

committing, in the first device, to the first motion value to determine a committed first motion value, the committed first motion value being bound to an output of a secure channel set-up;

sending the committed first motion value from the first device to the second device prior to receiving the second motion value from the second device;

receiving a committed second motion value at the first device from the second device;

sending, responsive to receiving the committed second motion value, a first decommitment value and the first motion value from the first device to the second device, the first decommitment value permitting verification of the committed first motion value;

receiving a second decommitment value and the second motion value at the first device from the second device, the second decommitment value permitting verification of the committed second motion value;

verifying, in the first device, the committed second motion value utilizing the second decommitment value and the second motion value; and determining whether the second motion value substantially matches the first motion value responsive to verifying the committed second motion value; and wherein the second motion value substantially matches the first motion value if a distance between the first motion value and the second motion value does not exceed a threshold distance metric.

2. The method of claim 1 wherein granting the access request comprises establishing a shared key between the first device and the second device.

3. The method of claim 1 wherein granting the access request comprises permitting access by the second device to a cryptographic key stored on the first device.

4. The method of claim 1 wherein granting the access request comprises unlocking the first device.

5. The method of claim 1 wherein the pairing protocol is performed with the second device and an authentication server, the first device being authenticated to the authentication server responsive to the successful pairing in accordance with the pairing protocol.

6. The method of claim 1 wherein the cryptographic commitment process further comprises the secure channel set-up, the secure channel set-up comprising establishing a secure channel via transport layer security (TLS), wherein the first device acts as a TLS client and the second device acts as a TLS server.

7. The method of claim 1 wherein the successful pairing in accordance with the pairing protocol is based at least in part on determining that the measured motion of the first device exceeds a threshold amount of movement, the threshold amount of movement comprising a non-zero amount of movement.

8. The method of claim 1 wherein the second motion value substantially matches the first motion value when the first and second devices perform correlated motions.

9. The method of claim 1 further comprising selecting the threshold distance metric for use in determining whether the second motion value substantially matches the first motion value.

10. The method of claim 1 further comprising initiating a follow-on authentication protocol responsive to the successful pairing in accordance with the pairing protocol.

11. The method of claim 1 wherein the pairing protocol comprises one factor in a multi-factor authentication process.

12. The method of claim 1 wherein determining whether the second motion value substantially matches the first motion value comprises:

determining, in the first device, whether a distance between the first motion value and the second motion value exceeds the threshold distance metric; and determining, in the first device, whether the first motion value represents at least a threshold amount of motion of the first device;

wherein the successful pairing in accordance with the pairing protocol is based on:

successfully verifying the committed second motion value;

determining that the distance between the first motion value and the second motion value does not exceed the threshold distance metric; and determining that the first motion value represents at least the threshold amount of motion.

13. An article of manufacture comprising a processor-readable storage medium having instruction code embodied therein which when executed by a processor of the first device implements the steps of the method of claim 1.

14. An apparatus comprising:

one or more motion sensors;

a memory; and a processor coupled to the memory and configured to implement a motion-based pairing module for a first device, the motion-based pairing module being configured to:

receive an access request;

initiate a motion measurement using the one or more motion sensors;

determine a first motion value based on the motion measurement;

perform a pairing protocol with a second device, the pairing protocol comprising a cryptographic commitment process; and grant the access request responsive to a successful pairing in accordance with the pairing protocol, the successful pairing being based at least in part on a determination that a second motion value supplied by the second device substantially matches the first motion value;

wherein the motion-based pairing module is configured to perform the cryptographic commitment process by:

committing, in the first device, to the first motion value to determine a committed first motion value, the committed first motion value being bound to an output of a secure channel set-up;

sending the committed first motion value from the first device to the second device prior to receiving the second motion value from the second device;

receiving a committed second motion value at the first device from the second device;

sending, responsive to receiving the committed second motion value, a first decommitment value and the first motion value from the first device to the second device, the first decommitment value permitting verification of the committed first motion value;

receiving a second decommitment value and the second motion value at the first device from the second device, the second decommitment value permitting verification of the committed second motion value;

verifying, in the first device, the committed second motion value utilizing the second decommitment value and the second motion value; and determining whether the second motion value substantially matches the first motion value responsive to verifying the committed second motion value; and wherein the second motion value substantially matches the first motion value if a distance between the first motion value and the second motion value does not exceed a threshold distance metric.

15. The apparatus of claim 14 wherein the one or more motion sensors comprise at least one of: one or more accelerometers; and one or more cameras.

16. The apparatus of claim 14 wherein the first device comprises one of a smartphone and a wearable computing device and the second device comprises the other one of the smartphone and the wearable computing device.

17. A method comprising:
sending, to a first device from a second device, an access request;
measuring a motion of the second device;
performing a pairing protocol with the first device, the pairing protocol comprising a cryptographic commitment process; and
receiving, from the first device, an indication that the access request is granted responsive to a successful pairing in accordance with the pairing protocol, the successful pairing being based at least in part on a determination that a first motion value supplied by the first device substantially matches a second motion value determined by said measuring;
wherein the cryptographic commitment process comprises:
committing, in the second device, to the second motion value to determine a committed second motion value, the committed second motion value being bound to an output of a secure channel set-up;
sending the committed second motion value from the second device to the first device prior to receiving the first motion value from the first device;
receiving a committed first motion value at the second device from the first device;
receiving, responsive to sending the committed second motion value to the first device, a first decommitment value and the first motion value in the second device from the first device, the first decommitment value permitting verification of the committed first motion value;
verifying, in the second device, the committed first motion value utilizing the first decommitment value and the first motion value; and
determining whether the first motion value substantially matches the second motion value responsive to verifying the committed first motion value; and
wherein the first motion value substantially matches the second motion value if a distance between the first motion value and the second motion value does not exceed a threshold distance metric.

18. The method of claim 17 wherein determining whether the first motion value substantially matches the second motion value comprises:
determining, in the second device, whether a distance between the first motion value and the second motion value exceeds the threshold distance metric; and
determining, in the second device, whether the second motion value represents at least a threshold amount of motion of the second device;
the method further comprising sending, from the second device to the first device, a second decommitment value and the second motion value responsive to:
successfully verifying the committed first motion value;
determining that the distance between the first motion value and the second motion value does not exceed the threshold distance metric; and
determining that the second motion value represents at least the threshold amount of motion.

19. An article of manufacture comprising a processor-readable storage medium having instruction code embodied therein which when executed by a processor of the second device implements the steps of the method of claim 17.

20. An apparatus comprising:
one or more motion sensors;
a memory; and
a processor coupled to the memory and configured to implement a motion-based pairing module for a second device, the motion-based pairing module being configured to:
send, to a first device, an access request;
initiate a motion measurement using the one or more sensors;
perform a pairing protocol with the first device, the pairing protocol comprising a cryptographic commitment process; and
receive, from the first device, an indication that the access request is granted responsive to a successful pairing in accordance with the pairing protocol, the successful pairing being based at least in part on a determination that a first motion value supplied by the first device substantially matches a second motion value determined based on the motion measurement;
wherein the motion-based pairing module is configured to perform the cryptographic commitment process by:
committing, in the second device, to the second motion value to determine a committed second motion value, the committed second motion value being bound to an output of a secure channel set-up;
sending the committed second motion value from the second device to the first device prior to receiving the first motion value from the first device;
receiving a committed first motion value at the second device from the first device;
receiving, responsive to sending the committed second motion value to the first device, a first decommitment value and the first motion value in the second device from the first device, the first decommitment value permitting verification of the committed first motion value;
verifying, in the second device, the committed first motion value utilizing the first decommitment value and the first motion value; and
determining whether the first motion value substantially matches the second motion value responsive to verifying the committed first motion value; and
wherein the first motion value substantially matches the second motion value if a distance between the first motion value and the second motion value does not exceed a threshold distance metric.

* * * * *